US012592498B2

(12) United States Patent
Billström et al.

(10) Patent No.: US 12,592,498 B2
(45) Date of Patent: Mar. 31, 2026

(54) ARRAY ANTENNA WITH DUAL POLARIZATION

(71) Applicant: SAAB AB, Linköping (SE)

(72) Inventors: Nicklas Billström, Lindome (SE); Andreas Wikström, Lindome (SE); Kenneth J-O Svensson, Gothenburg (SE); Max Wallén, Mölnlycke (SE)

(73) Assignee: SAAB AB, Linköping (SE)

( * ) Notice: Subject to any disclaimer, the term of this patent is extended or adjusted under 35 U.S.C. 154(b) by 153 days.

(21) Appl. No.: 18/555,882

(22) PCT Filed: Apr. 4, 2022

(86) PCT No.: PCT/SE2022/050331
§ 371 (c)(1),
(2) Date: Oct. 18, 2023

(87) PCT Pub. No.: WO2022/225434
PCT Pub. Date: Oct. 27, 2022

(65) Prior Publication Data

US 2024/0204422 A1 Jun. 20, 2024

(30) Foreign Application Priority Data

Apr. 23, 2021 (SE) .................................... 2100064-1

(51) Int. Cl.
*H01Q 21/24* (2006.01)
*H01Q 1/38* (2006.01)
(Continued)

(52) U.S. Cl.
CPC ............... *H01Q 21/24* (2013.01); *H01Q 1/38* (2013.01); *H01Q 9/42* (2013.01); *H01Q 13/085* (2013.01)

(58) Field of Classification Search
CPC ............ H01Q 21/24; H01Q 1/38; H01Q 9/42; H01Q 13/085
See application file for complete search history.

(56) References Cited

U.S. PATENT DOCUMENTS 5,081,466 A * 1/1992 Bitter, Jr. ............ H01Q 13/085 343/767
6,166,701 A 12/2000 Park et al.
(Continued)

FOREIGN PATENT DOCUMENTS

EP 1679764 A1 7/2006

OTHER PUBLICATIONS

Extended European Search Report mailed Jan. 31, 2025 for European Patent Application No. 22792101.2, 11 pages.
(Continued)

*Primary Examiner* — Hai V Tran
(74) *Attorney, Agent, or Firm* — Sage Patent Group

(57) ABSTRACT

Provided is an Active Electronically Scanned Array (AESA) including at least one planar Printed Circuit Board (PCB), a first set of first notch antenna elements arranged on the PCB, and a second set of second antenna elements; wherein the first and second antenna elements are interleaved, wherein each first antenna element is configured to transmit and/or receive, a signal having a first direction of polarization, and wherein each second antenna element is configured to transmit and/or receive, a signal having a second direction of polarization, which is different from the first direction of polarization, characterized in that each second antenna element is a notch antenna element which is included in a surface mounted element on the PCB, and wherein the first direction of polarization and the second direction of polarization is separated by at least 45°.

12 Claims, 8 Drawing Sheets

(51) Int. Cl.
*H01Q 9/42* (2006.01)
*H01Q 13/08* (2006.01)

(56) References Cited

U.S. PATENT DOCUMENTS 7,170,446 B1 * 1/2007 West .................... H01Q 13/085 342/372
8,350,767 B2 * 1/2013 Brigham ............ H01Q 21/0025 342/51
8,466,846 B1 * 6/2013 Elsallal .................... H01Q 1/38 343/770
8,736,504 B1 * 5/2014 West .................... H01Q 13/106 343/770
9,325,075 B1 * 4/2016 Lam ..................... H01Q 13/085
10,886,625 B2 * 1/2021 Franzini ................. H01Q 5/335
2008/0150799 A1 6/2008 Hemmi et al.
2011/0057852 A1 * 3/2011 Holland ............... H01Q 13/085 343/810
2017/0162950 A1 * 6/2017 Little ....................... H01Q 1/50
2019/0140362 A1 5/2019 Edenfield et al.
2021/0021046 A1 1/2021 Rashid et al.

OTHER PUBLICATIONS

International Search Report and Written Opinion mailed Apr. 8, 2022 for International Application No. PCT/SE2022/050331, 11 pages.
Office Action mailed May 26, 2025 for United Arab Emirates Patent Application No. P6002716/2023; 8 pages.

* cited by examiner

ARRAY ANTENNA WITH DUAL POLARIZATION

CROSS-REFERENCE TO RELATED APPLICATIONS

This application is a 35 U.S.C § 371 national stage application for International Application No. PCT/SE2022/050331, entitled "ARRAY ANTENNA WITH DUAL POLARIZATION", filed on Apr. 4, 2022, which claims priority to Swedish Patent Application No. 2100064-1, filed on Apr. 23, 2021, the disclosures and contents of which are hereby incorporated by reference in their entireties.

TECHNICAL FIELD

The present disclosure relates generally to the field of array antennas and more particularly, but not by way of limitation, to an array antenna with dual polarization.

BACKGROUND

Electronic scanning antennas capable of dual polarization are beneficial in a variety of applications. However, designing a dual polarization antenna have shown to be problematic and complicated, compared to designing a single polarization antenna. For instance, dual polarization in brick and slat design usually leads to complicated, expensive connections between antenna element and electronics, especially for wideband design.

According to Patent Literature 1 (EP1679764A1), it is known that despite the fact that dual polarized array antennas have numerous advantages, the production of some dual polarized array antennas can be either labor intensive or cost-prohibitive. For example, some configurations, e.g. cross-notch configuration or cross-dipole configurations create a dual polarization effect by positioning similar radiating elements at right angles to one another. In these configurations, the radio frequency feed lines, utilized to couple signal sources to the radiating elements, cannot remain coplanar. Rather, at least one of the feed lines needs a bend, twist, or some other transition to connect to its respective element. Such bends and/or twists undesirably increase the time and/or expenses involved in creating the dual-polarized array antenna. They also cause reflections and loss that reduce the antenna's efficiency.

AESA radars are increasingly being used for weather detection and prediction, providing new levels of scanning speed and accuracy for finding major events, such as tornadoes and thunderstorms. Electronic scanning antennas capable of dual polarization would be beneficial also in this application. In the field of weather radars, the cost is a very important factor, which has prevented an increased use of AESA radars for weather detection and prediction.

AESAs are also being increasingly used in telecommunication, e.g. 5G base station antennas. For instance, 5G uses beam steering technology that operates using AESA technology to increase throughput and deliver the high data rates required. However, also for base stations the cost is a very important factor, which has limited the use of AESAs for base stations.

SUMMARY

An object of the present disclosure is to provide a dual polarization active array antenna, which solves at least one of the problems mentioned above.

Another object of the present disclosure it to provide a dual polarization active array antenna which is less complicated to manufacture than the dual polarization array antennas according to the prior art.

Another object of the present disclosure it to provide a dual polarization array antenna which may be manufactured at a lower cost than the dual polarization array antennas according to the prior art.

An active electronically scanned array according to the independent claim fulfils the above objects. The active electronically scanned array according to the independent claim mitigates, obviates, alleviates, or eliminates one or more of the above problems with the current technology and/or improves communications in a wireless communications network. Various aspects of the disclosed technology are as set out in this summary section with examples of embodiments, which may be preferred embodiments.

Further advantages of the active electronically scanned array are fulfilled with the features of the dependent claims.

The extent of the protection shall be determined by the claims. Nevertheless, the present disclosure comprises example embodiments useful for interpreting the claims.

According to an aspect of the present disclosure, an Active Electronically Scanned Array, AESA, is provided. The AESA comprises at least one planar Printed Circuit Board, PCB, a first set of first notch antenna elements arranged on the PCB, and a second set of second antenna elements. The first antenna elements and the second antenna elements are interleaved. Each first antenna element is configured to transmit and/or receive, a signal having a first direction of polarization. Each second antenna element is configured to transmit and/or receive, a signal having a second direction of polarization, which is different from the first direction of polarization. The AESA is characterized in that, each second antenna element is a notch antenna element which is comprised in a surface mounted element mounted on the PCB. The first direction of polarization and the second direction of polarization are separated by at least 45°.

With an AESA according to the above aspect of the present disclosure, a favourable solution to the above described problems is provided. The fact that the Electronically Scanned Array is active means that it comprises drive electronics, the drive electronics may be integrated on the same PCB as the antenna elements or may be arranged on a separate PCB. The fact that the second antenna element is a notch antenna element which is comprised in a surface mounted element on the PCB makes it possible to manufacture a dual polarization electronically scanned array without the need of any expensive connections between the antenna elements and the electronics. Furthermore, by the second notch antenna elements being surface mounted the AESA is suitable for automated production using pick and place robots.

The signals transmitted by the first and second antenna elements are electromagnetic radiation.

A main direction of each transmitted signal may be defined as the direction around which the transmitted electromagnetic radiation is symmetrically distributed. All first antenna elements and second antenna elements may transmit electromagnetic radiation in main directions which are essentially parallel to each other.

According to another aspect of the present disclosure, the AESA may comprise a plurality of transceiver modules, TRMs. Each first antenna element and each second antenna element may be connected to a corresponding TRM, i.e., the AESA comprises a separate TRM for each first antenna element and for each second antenna element. The TRMs and the corresponding antenna elements are located on the same PCB. The connector-less design, reduce the complexity of assembling the AESA, while it reduce the reflections and loss improving the antenna's efficiency.

According to another aspect of the present disclosure, the AESA is design to have at least a first PCB and a second PCB wherein the first PCB and the second PCB are connected. The plurality of TRMs are mounted on the first PCB, and the first and second antenna elements are mounted on the second PCB. This design provides a connector-less design with respect to the first and second antenna elements, which reduce the complexity of assembling the first and second antenna elements, and reduce the reflections and loss improving the antenna's efficiency. In the same time, it enables an improved manufacturing process and enable complex design solutions.

According to another aspect of the present disclosure, the AESA comprises a plurality of stacked PCBs. Each PCB comprises a number of first antenna elements and second antenna elements. On each one of the PCBs the corresponding TRMs may also be arranged.

According to another aspect of the present disclosure, each first notch antenna elements is formed in at least one electrically conducting layer of the PCB. This facilitates the production as no additional elements have to be provided for the first notch antenna elements. It is preferable to form each first notch antenna elements in two layers being the outer layers of the PCB. In this way any interior layers of the PCB will be shielded by the outer layers.

According to another aspect of the present disclosure, each surface mounted element is mounted on an electrically conducting layer of the PCB. This is a non-complicated way of providing the ground connection for the surface mounted element.

According to another aspect of the present disclosure, each surface mounted element may be mounted on an electrically conducting layer of the PCB using, soldering, and/or electrically conductive gluing. These are methods are suitable for automated production.

According to another aspect of the present disclosure, each surface mounted element may comprise a conductive sheet comprising a first planar part in which the second antenna elements is formed, wherein the first planar part is arranged angled at least 45° in relation to the PCB. The angle is defined as the angle between the normal to the first planar part and the normal to the planar PCB. The direction of polarisation of the signal transmitted from the second antenna elements is determined by the angle of the first planar part in relation to the PCB According to another aspect of the present disclosure, the conductive sheet may comprise a second planar part, which is parallel to the PCB. With such a second planar part the mounting of the surface mounted element on the PCB is facilitated as the second planar part provides a surface for soldering/gluing and also provides mechanical stability when mounted.

According to another aspect of the present disclosure, each surface mounted element may consist of the first planar part and the second planar part. This provides the advantage that the surface mounted element may be manufactured for example by stamping the first and second part as a single piece from sheet metal, followed by bending of each stamped piece to form the surface mounted element. This procedure will give the surface mounted element an L-shaped form. The sheet metal is chosen to have a sufficient thickness to be self-supporting.

According to another aspect of the present disclosure, each surface mounted element may comprise a separate mechanically supporting element having planar surfaces on which the first planar part and the second planar part are arranged. In this case, the conductive sheet does not have to be self-supporting and may thus be made thinner.

According to another aspect of the present disclosure, the first direction of polarization and the second direction of polarization may be separated by at least 85°, and are preferably essentially orthogonal to each other. By having the directions of polarization essentially orthogonal to each other, the cross-coupling of the signals may be minimized.

According to another aspect of the present disclosure, the AESA may comprise a plurality of transceiver modules, TRMs, wherein each first antenna element and each second antenna element is connected to a corresponding transceiver module, TRM. By having a separate transceiver module to each first antenna element and each second antenna element all antenna elements may be controlled individually.

According to another aspect of the present disclosure, each first antenna element and/or each second antenna element may be a Tapered Slot Antenna, TSA, or a stepped notch antenna. These two types are especially suitable for the present AESA.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
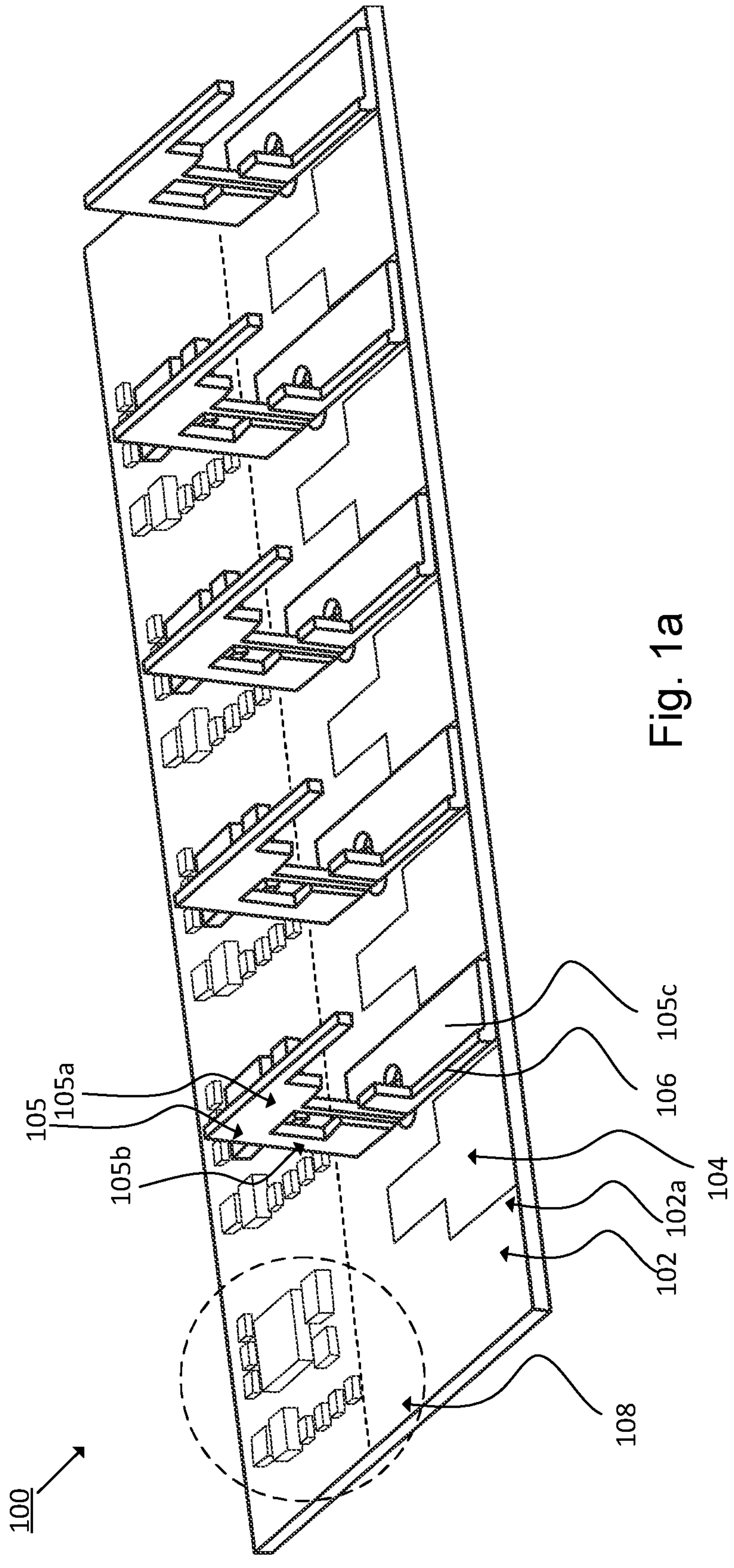
FIG. 1*a*-1*b* schematically illustrates a simplified architecture of an Active Electronically Scanned Array, AESA.

In the following detailed description illustrative and non-limiting exemplary embodiments will be described, with reference to the appended drawings. In the drawings, similar features in different drawings are denoted by the same reference numerals.

The terminology used herein is for the purpose of describing particular aspects of the disclosure only, and is not intended to limit the present disclosure. As used herein, the singular forms "a", "an" and "the" are intended to include the plural forms as well, unless the context clearly indicates otherwise.

Some of the example embodiments presented herein are directed towards an Active Electronically Scanned Array, AESA. As part of the development of the example embodiments presented herein, a problem will first be identified and discussed.

Figure 1B:
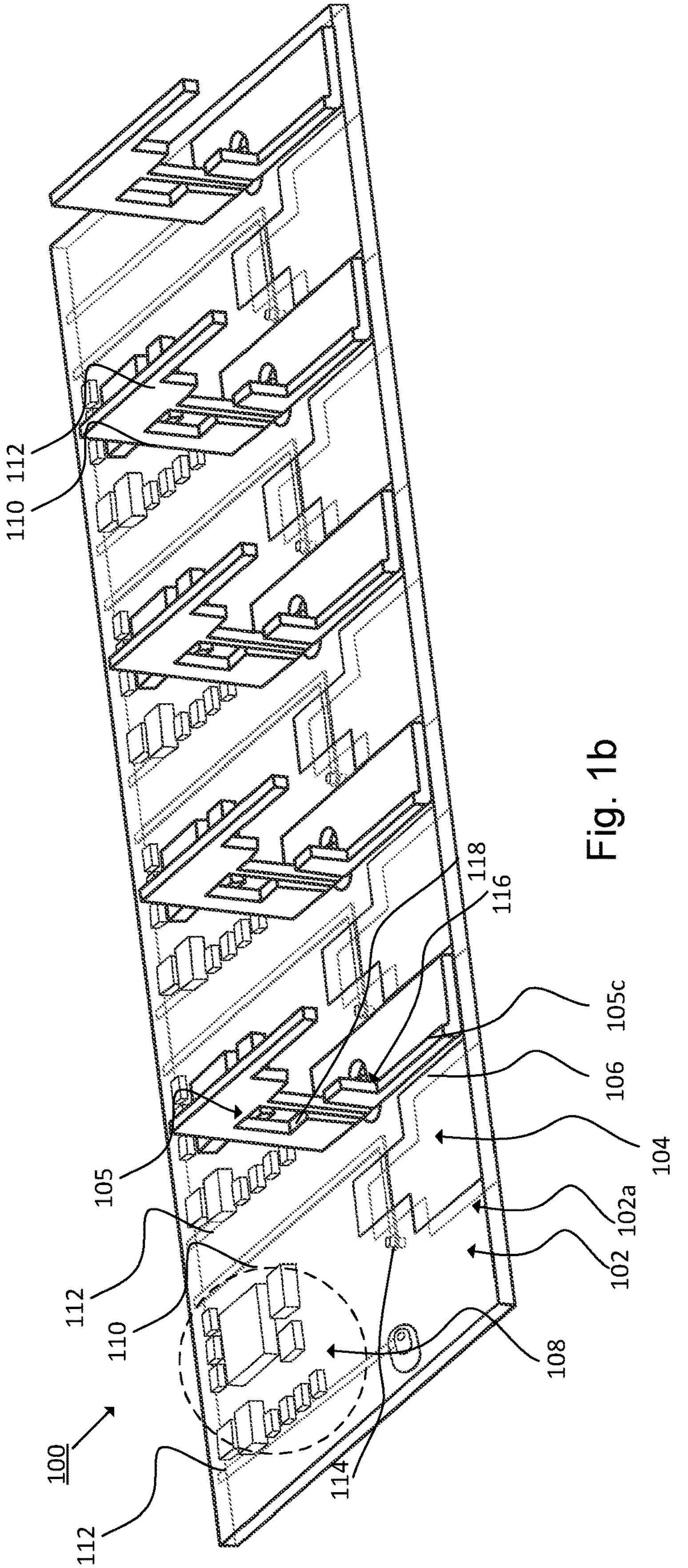

FIG. 1*a*-1*b* illustrates an Active Electronically Scanned Array, AESA, 100 according to an embodiment of the present disclosure.

FIG. 1*a* illustrates the AESA 100 comprising a first set of first notch antenna elements 104 arranged on a planar Printed Circuit Board, PCB 102, and a second set of second antenna elements 106 arranged on the PCB 102. Each first antenna element 104 is configured to transmit and/or receive a signal as electromagnetic radiation having a first direction of polarization and each second antenna element 106 is configured to transmit and/or receive, a signal as electromagnetic radiation having a second direction of polarization, which is different from the first direction of polarization. Mounted on the PCB 102 is a plurality of transceiver modules, TRMs, 108 wherein one TRM 108 controls the reception and transmission of at least one first or second antenna element 104, 106. Each TRM comprises electrical components and is designed and configured to control between one up to at least eight antenna elements, for instance a TRM may control eight antenna elements, e.g. four first antenna elements and four second antenna elements, i.e. four pairs of antenna elements. In the embodiment illustrated in FIG. 1*a*-1*b* the first and second antenna elements 104, 106 are both notch antenna elements. The first antenna elements 104 are formed in an electrically conducting layer 102*a* of the PCB 102.

Each second antenna element 106 is comprised in a corresponding surface mounted element 105. Each surface mounted element 105 comprises a conductive sheet 105*a* mounted on an electrically conducting layer 102*a* of the PCB 102. Each surface mounted element 105 comprises a conductive sheet 105*a* comprising a first planar part 105*b* in which the second antenna elements 106 is formed, wherein the first planar part 105*b* is arranged angled at least 45° in relation to the PCB 102. As shown in FIG. 1*a*, the conductive sheet 105*a* comprises a second planar part 105*c* which is parallel to the PCB 102. By having the first antenna elements 104 perpendicular to the second antenna elements 106, an orthogonal polarization is obtained. The second planar part 105*c* of the conductive sheet 105*a* gives the advantages of supporting the surface mounted elements 105, which comprises the second antenna elements 106. However, the shape and form of the conductive sheet 105*a* may be any shape and form, as will be disclosed later in relation to FIG. 4*a*-4*b*.

The first antenna elements 104 and the second antenna elements 106 are in this example embodiment notch antennas.

The dashed line in FIG. 1*a* indicates where the PCB 102 might be divided into two separate PCBs with the antenna elements 104, 106 on one PCB and the TRMs 108 on another PCB. The different PCBs would have to be connected with connectors.

FIG. 1*b* shows partly in cross section the AESA 100 shown in FIG. 1*a*. FIG. 1*b* shows a set of first and second integrated strip lines 110, 112 wherein each first and second strip line 110, 112 are feeding the corresponding first antenna elements 104 and the second antenna elements 106.

Each first integrated strip line 110 connects to a first antenna element 104 via a first connecting point 114. The first antenna elements 104 are excited by the corresponding first integrated strip line 110 passing over the gap of the first antenna element 104.

Each second integrated strip line 112 connects to a second antenna element 106 via a second connecting point 116 and a RF, radio frequency, feeder-pin 118, wherein the RF feeder-pin 118 is comprised in the surface mounted element 105 comprising the second antenna element 106.

Figure 2A:
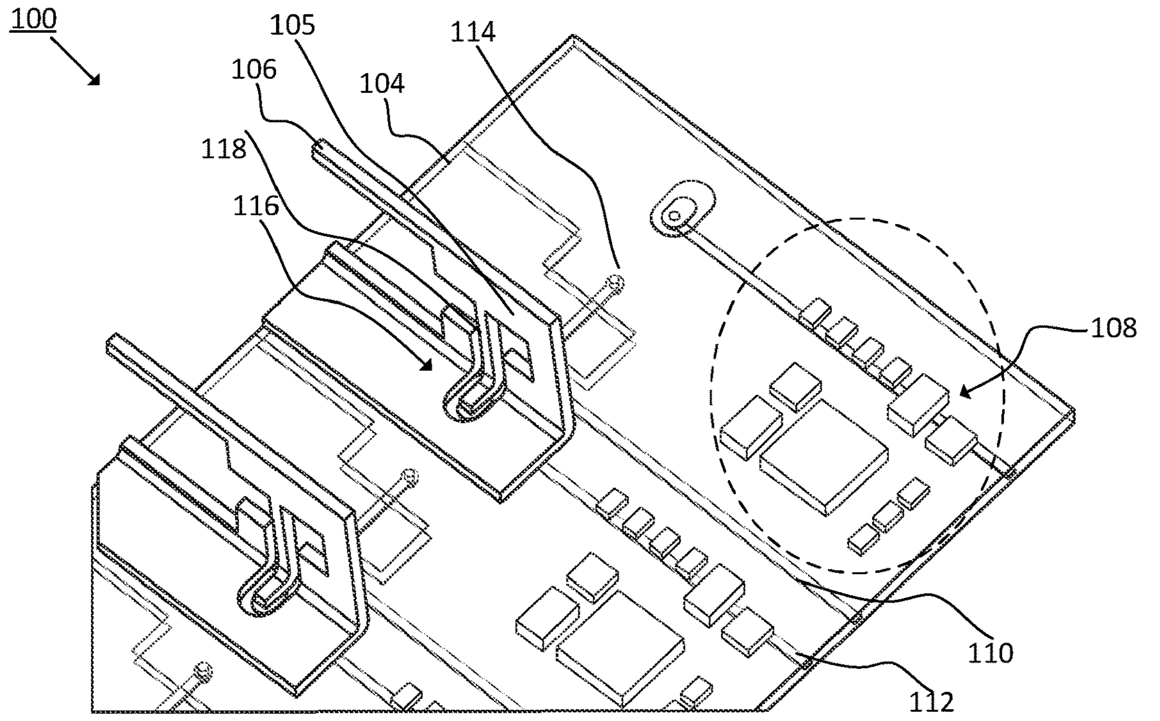
FIG. 2*a*-2*b* schematically illustrates a simplified cross section view an Active Electronically Scanned Array, AESA.
Figure 2B:
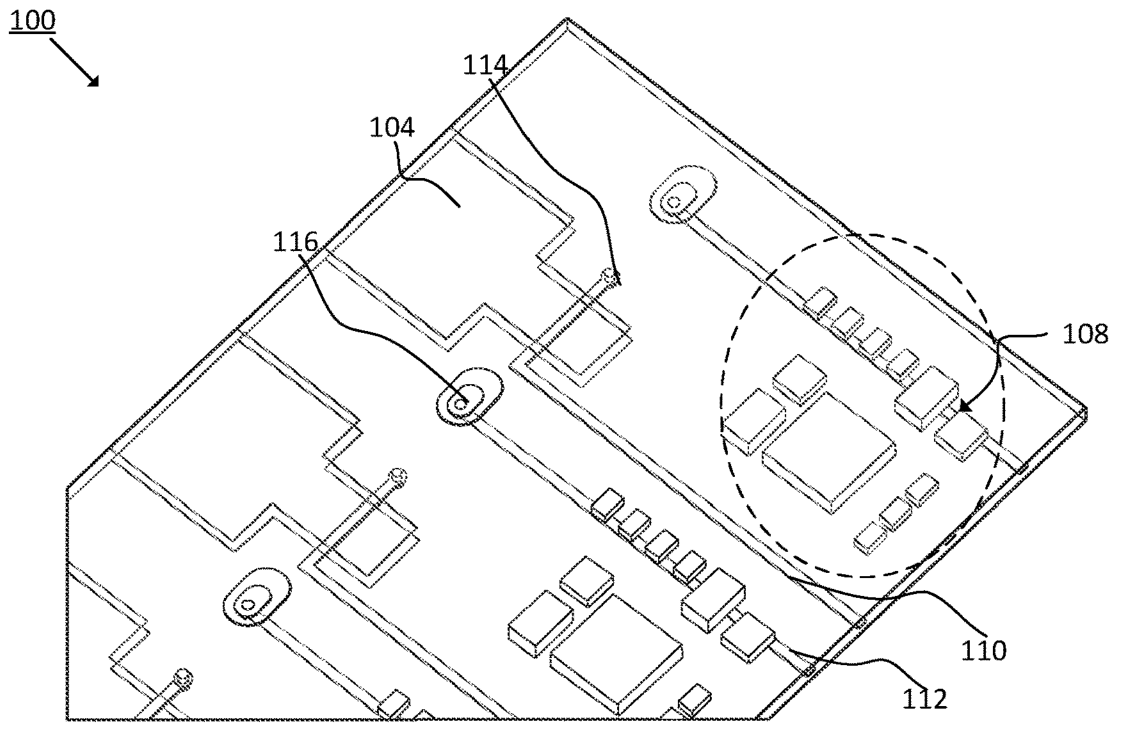

FIG. 2*a*-2*b* illustrates a detailed partly cross section view of the AESA 100, with and without surface mounted element 105 visible. The surface mounted element 105 is merely removed in FIG. 2*b* for better understanding the design of the AESA 100.

Figure 3A:
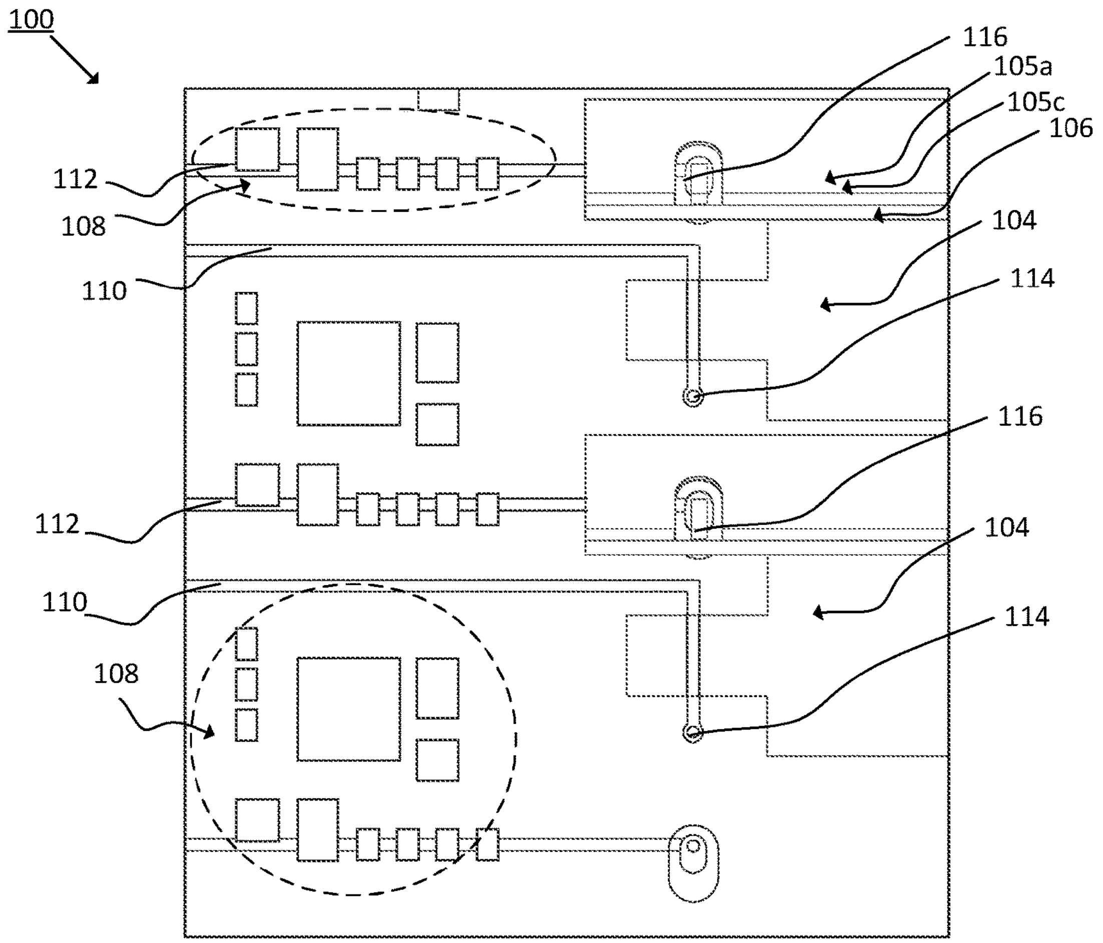
FIG. 3*a*-3*c* illustrates cross section views of the Active Electronically Scanned Array, AESA, seen from above and the sides.
Figure 3B:
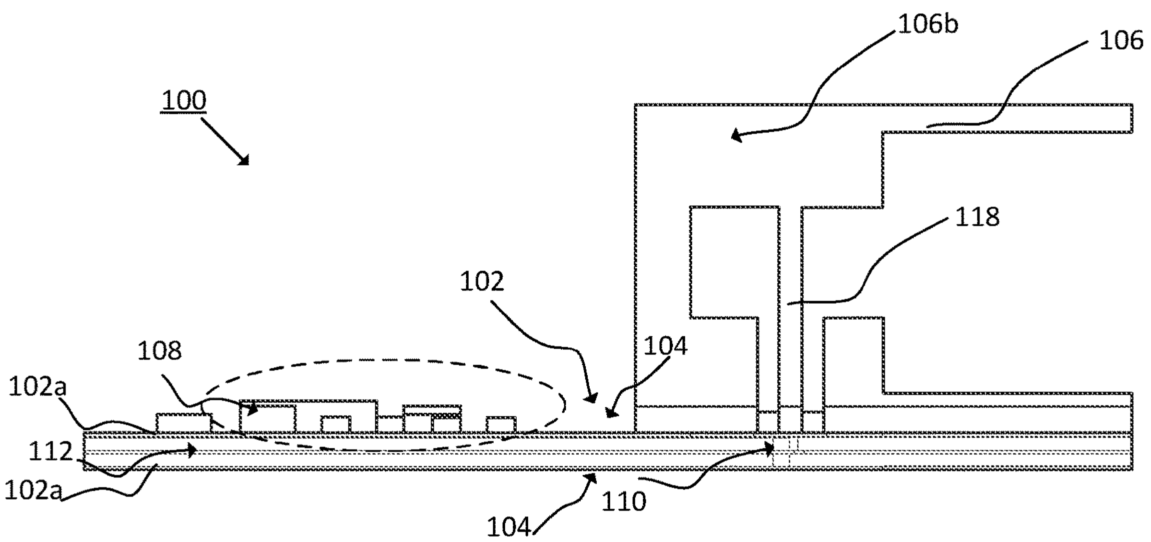
Figure 3C:
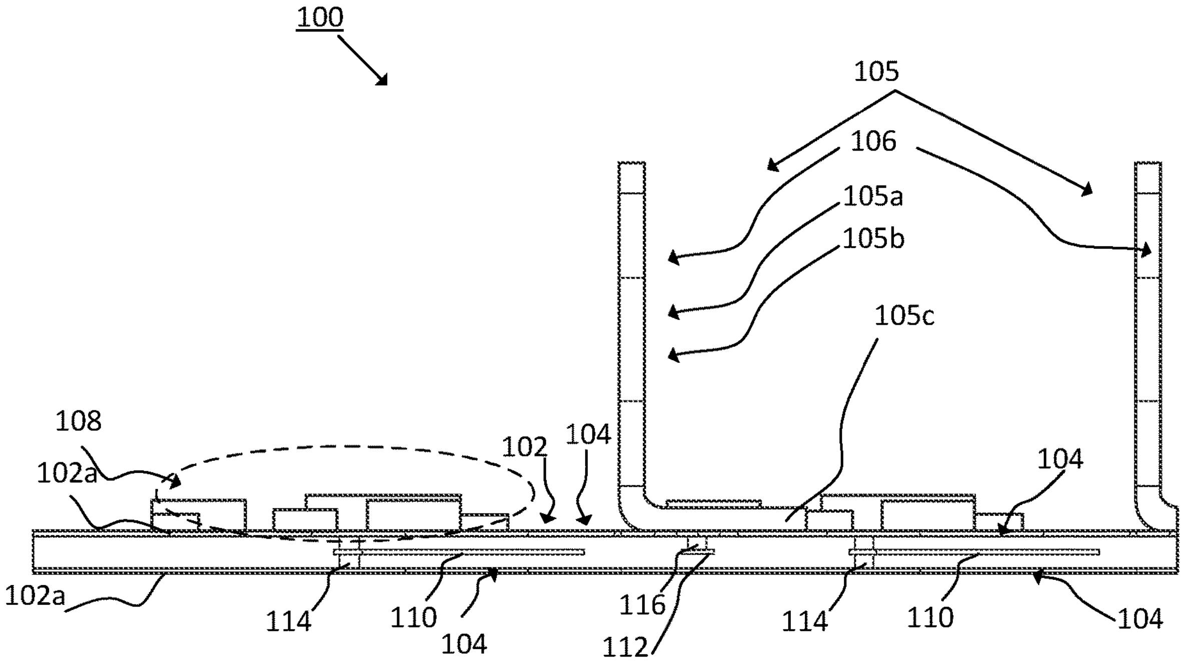

FIG. 3*a*-3*c* illustrates cross section views of the AESA 100 seen from above in FIG. 3*a*, and the sides in FIG. 3*b*-3*c*. In FIG. 3*b*-3*c*, it can be seen that the planar PCB 102 comprises two electrically conducting layers 102*a*, one on each sides of the PCB 102, and at least two integrated layers of conducting strip lines 110, 112. The first antenna elements 104 (not explicitly shown in FIG. 3*b*-3*c*, only indicated by reference sign) are formed in the two electrically conducting layers 102*a* of the PCB 102.

Figure 4A:
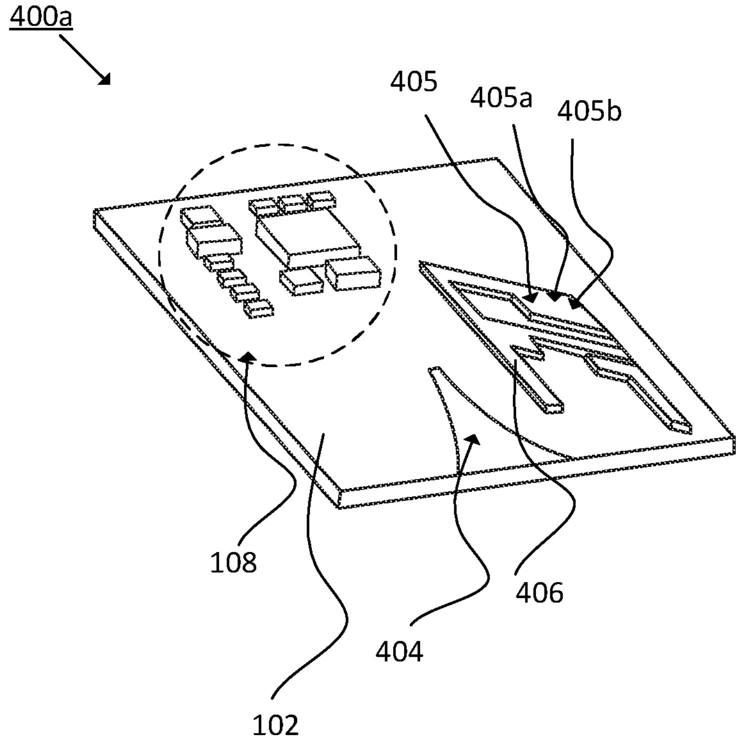
FIG. 4*a*-4*c* schematically illustrates example Active Electronically Scanned Array, AESA, according to some of the example embodiments.

FIG. 4*a* illustrates an exemplifying embodiment of the AESA 400*a*, having a first direction of polarization, obtained by the first antenna elements 404, in a first plane parallel to the planar PCB 102, and a second direction of polarization, obtained by the second antenna elements 406 in a second plane angled angled at least 45° compared to the first plane.

This is particularly advantageous when performing two separated operations at the same time with the first and second antenna elements 104, 106. This is often the case for weather radars.

The AESA according to this disclosure may be used in telecommunication, e.g. 5G base station antennas. In such the application the separated operations may be, e.g. ensure receiving a transmission signal, regardless of the polarization of the transmitted signal. The AESA according to this disclosure may also be used in military aircraft. In such the application the separated operations may be, e.g., electronic warfare, EW, and radar operation or communication.

FIG. 4*a* also illustrates an embodiment of the AESA 400*a* in which the first antenna elements 404 are a Tapered Slot Antenna, TSA and the second antenna elements 406 are stepped notch antenna elements. The first and second antenna elements 104, 404; 106, 406 may have different shapes and size, and thereby be designed so that the first and second antenna elements 404, 406 may have different bandwidth.

FIG. 4*a* also illustrates that each surface mounted element 405, comprises a conductive sheet 405*a* comprising a first planar part 405*b* in which the second antenna elements 406 is formed, wherein the first planar part 405*b* is arranged angled at least 45° in relation to the PCB 102. Each surface mounted element 405 is configured to be mounted on an electrically conducting layer 102*a* (not shown) of the PCB 102. The surface mounted element 405, comprising the conductive sheet 405*a*, may be described as I-shaped surface mounted element 405, since it does not have protruding parts relative the first planar part 405*b*, compared to the example embodiments described in relation to FIG. 1*a*-1*b*, and FIG. 4*b*. This is advantageous since the surface mounted element 405 does not comprise any protruding parts, and the AESA 400 may be designed in a very compact manner.

Figure 4B:
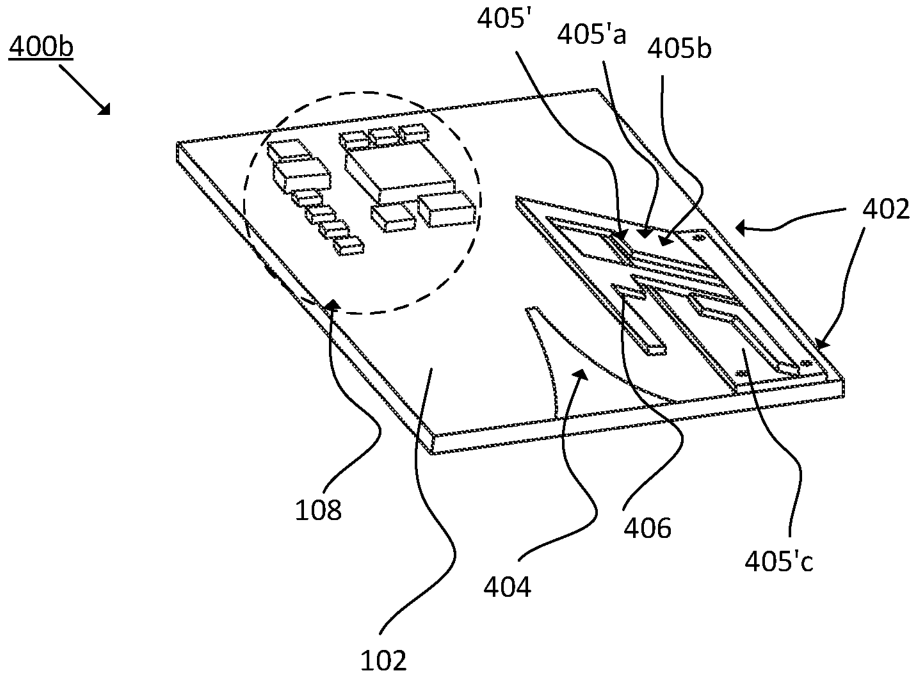

FIG. 4*b* illustrates an example embodiment of the AESA 400*b* wherein the surface mounted elements 405', comprising the second antenna elements 406, are mounted to the PCB 102 utilizing at least one hole (not shown) in the PCB 102, and corresponding number of pins 402 on the surface mounted elements 405', wherein the at least one hole is configured to receive the corresponding number of pins 402. Each surface mounted elements 405' has been mounted on an electrically conducting layer 102*a* (not shown) of the PCB 102 using, soldering, electrically conductive gluing and/or utilizing one or more holes in the PCB 102 configured to receive protruding pins 402 of the surface mounted element 405' comprising the second antenna element 406.

In FIG. 4*b*, it is shown that a second planar part 405*c* is protruding on both sides of the surface mounted elements 406*a*, comprising the second antenna elements 406. This gives the advantages of supporting the surface mounted elements 405' which comprises the second antenna elements 406.

Figure 4C:
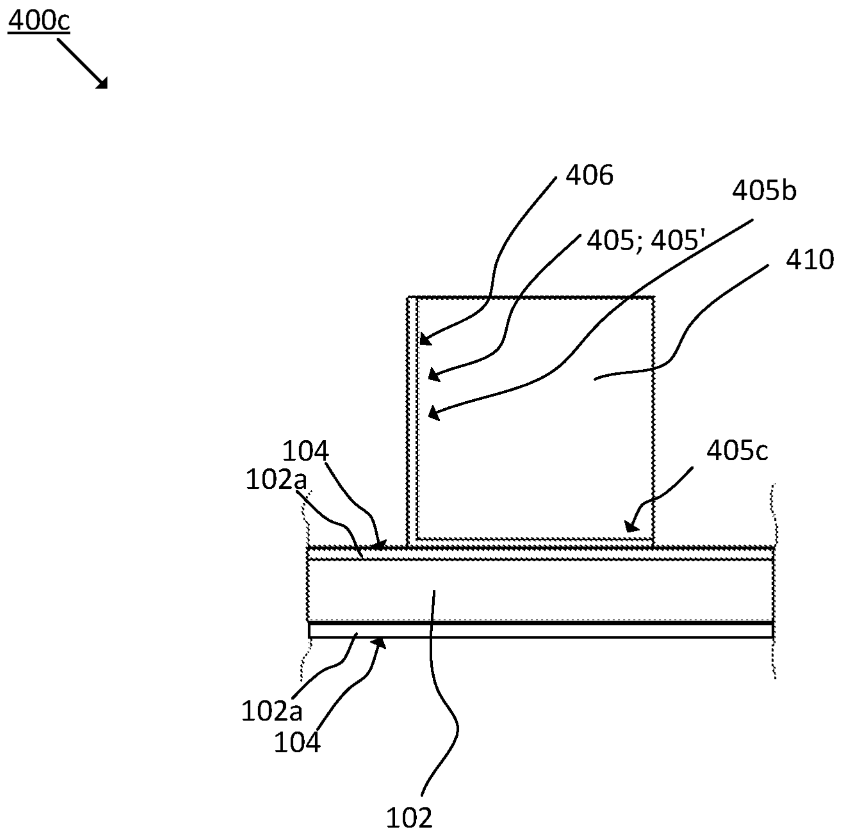

In FIG. 4*c*, illustrate an example embodiment of the AESA 400*c* it is shown a plastic support 410, which is supporting surface mounted elements 405', comprising the second antenna elements 406. The plastic support 410 is particularly advantageous when designing very thin second antenna elements 406.

According to one example embodiment the Active Electronically Scanned Array, AESA 100; 400*a*-400*c* comprising at least one planar Printed Circuit Board, PCB 102, a first set of first notch antenna elements 104 arranged on the PCB 102, and a second set of second antenna elements 106. Wherein the first antenna elements 104 and second antenna elements 106 are interleaved. Each first antenna element 104 is configured to transmit and/or receive, a signal having a first direction of polarization. Each second antenna element 106 is configured to transmit and/or receive, a signal having a second direction of polarization, which is different from the first direction of polarization. Further, each second antenna element 106 is a notch antenna element, which is comprised, in a surface mounted element 105 on the PCB 102. The first direction of polarization and the second direction of polarization is separated by at least 45°.

The PCB 102 may be made of any suitable material, and may be a multi-layer PCB, for instance an 8-layer PCB. The antenna elements 104; 404 and the second antenna elements 106; 406 is made of a conductive material. The surface mounted element 105, comprising the second antenna elements 106; 406, is made of a conductive material.

Figure 5A:
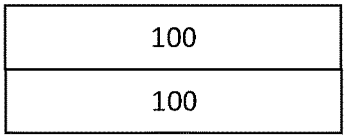
FIG. 5*a*-5*b* schematically illustrates an Active Electronically Scanned Array, AESA, according to example embodiments.
Figure 5B:
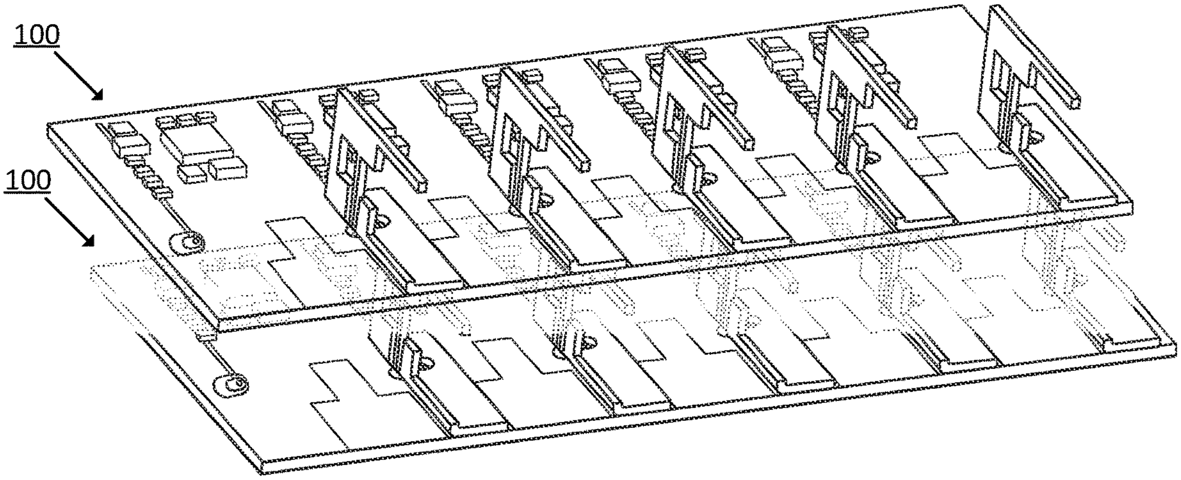

FIG. 5*a*-5*b* illustrates an exemplifying embodiment of the AESA 100; 400*a*-400*c*, wherein the at least one AESA is stacked upon another AESA. In FIGS. 5*a*-5*b* the TRMs are arranged on the same PCB as the corresponding antenna elements.

According to another example embodiment the AESA 100; 400*a*-400*c* is configured so that each first notch antenna elements 104; 404 are formed in an electrically conducting layer 102*a* of the PCB 102. For example, the first antenna elements 104 can be formed in the two electrically conducting layers 102*a* of the PCB 102. By having the notch antenna elements 104, 404 integrated in the PCB 102 the AESA 100; 400*a*-400*c* can be designed in a very compact manner.

According to another example embodiment of the AESA 100; 400*a*-400*c* each surface mounted element 105; 405, is mounted on an electrically conducting layer 102*a* of the PCB 102. The conductive sheet 105*a*; 406*b*; 406*b*' of the surface mounted elements 105; 405 is connected to layers on one or both sides of the PCB 102 and/or layers within the PCB 102. In other words, if the PCB 102 is a multiplayer PCB, e.g. an 8-layer PCB, the connection can be made to layers, e.g. strip lines, layers on one or both sides of the PCB and/or layers within the PCB.

According to another example embodiment of the AESA 100; 400*a*-400*c*, each surface mounted element (105) has been mounted on an electrically conducting layer 102*a* of the PCB 102 using soldering, and/or electrically conductive gluing. Another example of mounting each antenna element 106; 406 is using pins 402 on the antenna elements 106; 406 to be received in corresponding holes on the PCB 102. Each pair of pins 402 and holes is configured to electrically connect the antenna elements 106; 406 to the PCB 102.

According to another example embodiment of the AESA 100; 400*a*-400*c*, wherein each surface mounted element 105; 405 comprises a conductive sheet 105*a* comprising a first planar part 105*b* in which the second antenna elements 106; 406 is formed, wherein the first planar part 105*b* is arranged angled at least 45° in relation to the PCB 102.

According to another example embodiment of the AESA 100; 400*a*-400*c*, wherein the conductive sheet comprises a second planar part 105*c* which is parallel to the PCB 102. For example, the conductive sheets 105*a* may have an L-shaped surface mounted element 105, illustrated in FIG. 1*a*-3*c*, or T-shaped surface mounted element 405', illustrated in FIG. 4*b*. The conductive sheets 105*a* may also be design without protruding part(s), i.e. without a bent conductive sheet 105*a*, thereby having an I-shaped surface mounted element 406*b* design illustrated in FIG. 4*a*. The protruding part having an improved support for the surface mounted elements 105. Another example of improving the support of the surface mounted elements 105; 405; 405' may be to have a non-conductive material, e.g. plastic, forming a supporting structure, e.g. a block to which the surface mounted elements 105; 405; 405' may obtain support.

According to another example embodiment of the AESA 100; 400*a*-400*c*, wherein each surface mounted element 105 consists of the first part and the second part.

According to another example embodiment of the AESA 100; 400*a*-400*c*, wherein the first direction of polarization and the second direction of polarization are separated by at least 85°, and are preferably essentially orthogonal to each other.

According to another example embodiment of the AESA 100; 400*a*-400*c*, may comprising a plurality of transceiver modules, TRMs, 108, wherein each first antenna element 104; 404 and each second antenna element 106; 406 is connected to a corresponding TRM 108.

According to another example embodiment of the AESA 100; 400*a*-400*c*, wherein the each first antenna element 104; 404 and/or each second antenna element 106; 406 is a Tapered Slot Antenna, TSA, or a stepped notch antenna. This example, previously illustrated in relation to FIG. 4*a*-4*b*, is showing that a first antenna elements 404 may have a different notch-antenna element form compared to the second antenna elements 406. The first and second antenna elements may also have different size of their notch antenna elements. In other words, the first antenna elements and the second antenna elements may have different size and/or form, which will affect their respective behaviors. This gives the advantages of designing an AESA 400*a*; 400*b* having different bandwidth.

The above described embodiments may be altered in many ways without departing from the scope of the present disclosure, which is limited only by means of the appended claims and their limitations.

The invention claimed is:

1. An Active Electronically Scanned Array (AESA) comprising:

at least one planar Printed Circuit Board (PCB);

a first set of first notch antenna elements arranged on the PCB; and a second set of second antenna elements, wherein the first set of first notch antenna elements and the second set of second antenna elements are interleaved, wherein each first notch antenna element is configured to transmit and/or receive, a signal having a first direction of polarization, and wherein each second antenna element is configured to transmit and/or receive, a signal having a second direction of polarization, which is different from the first direction of polarization, wherein each second antenna element is a notch antenna element which is comprised in a surface mounted element on the PCB, and wherein the first direction of polarization and the second direction of polarization is separated by at least 45°.

2. The AESA according to claim 1, wherein each first notch antenna element is formed in at least one electrically conducting layer of the PCB.

3. The AESA according to claim 1, wherein the surface mounted element, is mounted on an electrically conducting layer of the PCB.

4. The AESA according to claim 1, wherein the surface mounted element has been mounted on an electrically conducting layer of the PCB using, soldering, and/or electrically conductive gluing.

5. The AESA according to claim 1, wherein the surface mounted element comprises a conductive sheet comprising a first planar part in which the respective second antenna element is formed, wherein the first planar part is arranged angled at least 45° in relation to the PCB.

6. The AESA according to claim 5, wherein the conductive sheet comprises a second planar part which is parallel to the PCB.

7. The AESA according to claim 6, wherein each surface mounted element consists of a first part and a second part.

8. The AESA according to claim 1, wherein the first direction of polarization and the second direction of polarization are separated by at least 85°, and are orthogonal to each other.

9. The AESA according to claim 1, wherein each first notch antenna element and/or each second antenna element is:

a Tapered Slot Antenna (TSA); or a stepped notch antenna.

10. The AESA according to claim 1, comprising a plurality of transceiver modules (TRMs), wherein each first notch antenna element and each second antenna element is connected to a corresponding transceiver module (TRM).

11. The AESA according to claim 10, wherein the TRMs and the antenna elements are located on the same PCB.

12. The AESA according to claim 11, wherein the AESA comprises a plurality of stacked PCB's.

* * * * *